May 31, 1955

J. LECHER 2,709,552

METHOD AND APPARATUS FOR REDUCING SOLID MATERIALS
UTILIZING VIBRATORY SHOCK WAVES

Filed March 6, 1952

INVENTOR.
JOSEPH LECHER
BY
Paul, Paul & Moore

ATTORNEYS

INVENTOR.
JOSEPH LECHER
BY
Paul, Paul & Moore
ATTORNEYS

INVENTOR.
JOSEPH LECHER
BY
Paul, Paul & Moore
ATTORNEYS

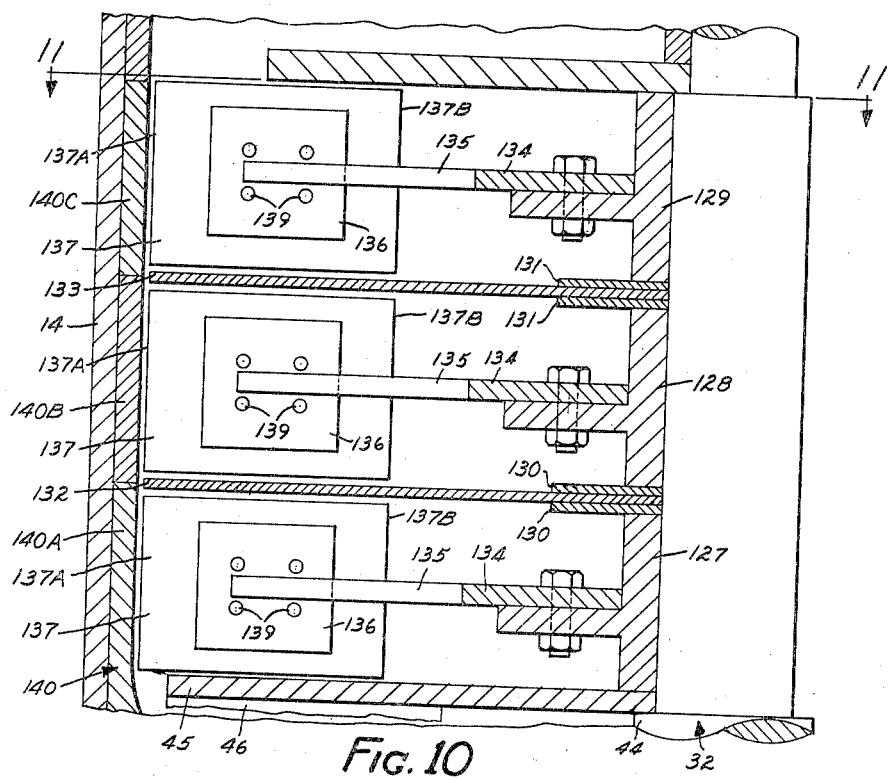
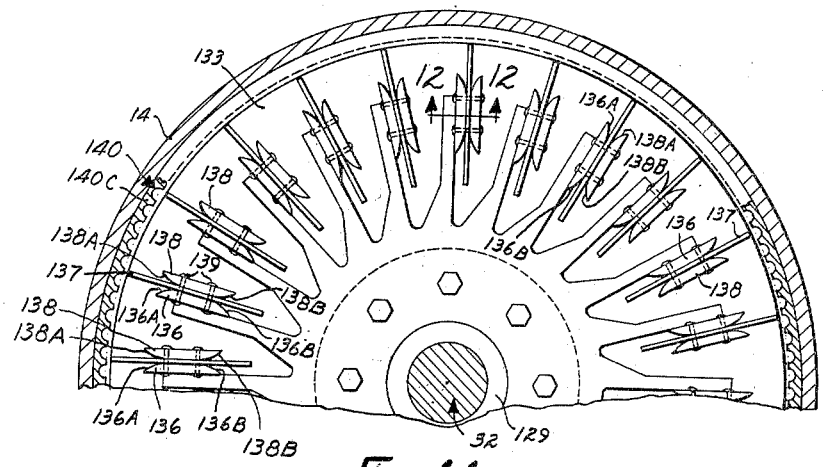

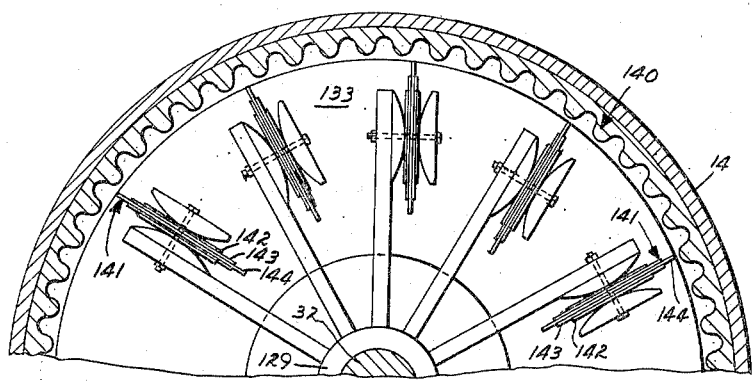
Fig. 13
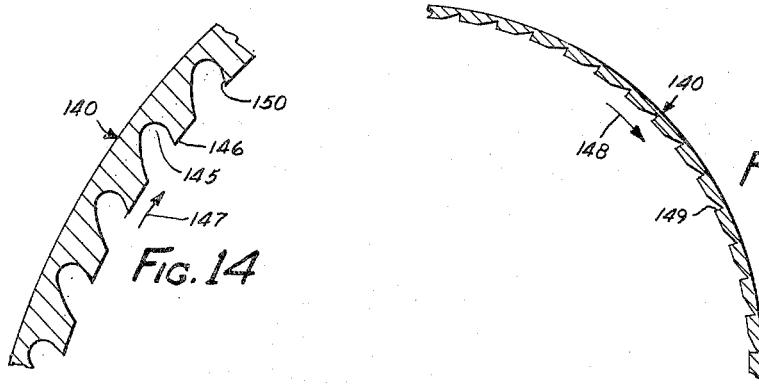
Fig. 14
Fig. 15
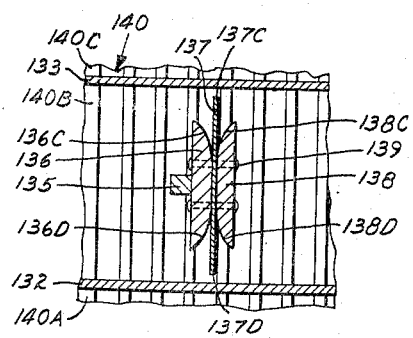
Fig. 12
INVENTOR.
JOSEPH LECHER
BY
ATTORNEYS

United States Patent Office 2,709,552
Patented May 31, 1955

2,709,552

METHOD AND APPARATUS FOR REDUCING SOLID MATERIALS UTILIZING VIBRATORY SHOCK WAVES

Joseph Lecher, Basel, Switzerland, assignor to The Microcyclomat Co., Minneapolis, Minn., a corporation of Delaware Application March 6, 1952, Serial No. 275,120

17 Claims. (Cl. 241—1)

This invention relates to an apparatus for treating solid materials and more particularly for reducing the size of solid particles.

This invention relates to an apparatus for processing materials and more particularly to apparatus for pulverizing materials in dry condition and while such materials are carried by a flow of gaseous fluid. In the dry pulverizing of materials utilizing methods and apparatus heretofore known, it has been possible to produce particles of a micron size of ten microns. With some types of materials and machines, it has been possible to produce materials in which a majority of the resultant solid particles are below five microns and wherein the major fraction below five microns has an average particle size as low as three microns. However, utilizing known methods and apparatus, it has been practically impossible economically to reduce materials to less than three micron size on an average and it is very difficult even to achieve such small average particle size. When the material is reduced to, for example, three micron size, the mass of the individual particles is exceedingly small and the particles behave differently than the same material does when it has a larger particle size. Thus, most materials when reduced to a fineness size of three to five microns, exhibit at this size range a change in the chemical, magnetic and electrostatic behaviors and a change in ignition temperature, capillarity, susceptibility to infiltration of moisture and change in flow as a fluid, as well as changes in surface activity and changes in apparent chemical properties. For practical purposes it has heretofore not been possible reliably to produce on a commercial scale pulverized materials of any kind wherein the particle size is much less than ten microns. This, of course, varies somewhat, depending upon the materials, but generally speaking, ten microns has been the usual lower commercial limit, and five micron materials are regarded as exceptional. Dry pulverized materials of three micron size are exceedingly difficult to produce. For the purposes of nomenclature in respect to the instant invention, the term "ultra-fine" will be understood to designate material of less than ten microns average particle size, and "fine" will be used to designate materials ranging from about the minimum particle size that can be sieved (i. e. about fifty microns) down to ten microns.

It is an object of the instant invention to provide improved apparatus for the production of ultra-fine particles.

It is a further object of the invention to provide apparatus whereby materials may be pulverized on a commercial scale having a particle size of less than five microns and having predominantly a particle size of three microns and even smaller.

It is a further object of the invention to provide an apparatus wherein materials to be treated are carried by a flow of gaseous fluid, such as air, inert gases, reactive gases, steam or the like, to which optionally there may be added minor amounts of liquids, or vapors, and simultaneously or substantially simultaneously subjected to reduction by attrition and/or collision and to the effect of intense sonic energy.

It is a further object of the invention to provide an apparatus wherein solid materials are carried in a dry or substantially dry state in a gaseous fluid, such as air, inert gases, reactive gases, steam or the like and while being so carried are subjected to the simultaneous application of shock and/or friction and intense sonic energy which is generated in the gaseous fluid.

It is a further object of the invention to provide apparatus for subjecting material to be pulverized or otherwise treated to collision either between the particles themselves or between the particles and a grinding surface, and while the particles of solid material are thus subjected to shock, simultaneously or substantially simultaneously subjecting said particles to intense sonic energy having a frequency range from the low audible through the middle and high audible frequencies and into the ultrasonic range and wherein the sound energy is in excess of 120 decibels.

It is a further object of the invention to provide apparatus wherein material to be pulverized is carried by a gaseous flow through a reaction chamber defined by a stationary wall and by relatively movable members and wherein the relatively movable members are subjected to intense vibration and subject the gaseous flow in said chmaber and the material carried thereby to intense sonic vibration.

It is a further object of the invention to provide apparatus wherein material to be pulverized is carried by a gaseous flow through a reaction chamber wherein the material is subjected to shock by collision between the particles of the material or between particles of the material and the reaction chamber and wherein the flow of gaseous fluid and the thus shocked particles of material are passed through a succession of passageways defined by relatively movable surfaces and wherein at least some of said surfaces are maintained in intense vibration for generating intense sonic energy in said gaseous fluid and in which the velocity of the gaseous fluid relative to said chamber and/or surfaces is, at least at sometimes, in excess of 33,00 feet per minute.

It is a further object of the invention to provide a rotary milling apparatus for subjecting dry or substantially dry materials while carried by a dry or substantially dry gaseous fluid to pulverizing forces of collision, attrition and/or shock for shattering the material and simultaneously or substantially simultaneously subjecting such materials to the disintegrating forces of intense sonic energy generated in the rotary milling apparatus by vibratory radial and/or planar vibrating elements therein.

It is a further object of the invention to provide a rotary mill for subjecting materials while carried by a dry gaseous fluid to pulverizing forces of attrition, collision and/or shock and simultaneously or substantially simultaneously subjecting the solid materials to the disintegrating forces induced by generating intense sonic vibrations and/or subsonic shock waves in said gaseous fluid.

Other and further objects of the invention are those inherent in the methods and apparatus herein illustrated, described and claimed.

The invention is illustrated with reference to the drawings in which:

Figure 10 is an enlarged fragmentary vertical-sectional view of a somewhat modified form of the invention;

Figure 11 is a fragmentary horizontal sectional view taken along the line and in the direction of the arrows 11—11 of Figure 10;

Figure 12 is a fragmentary vertical sectional view taken along the line and in the direction of arrows 12—12 of Figure 11;

Figure 13 is a fragmentary horizontal sectional view of a modified form of rotor and stator structure;

Figure 14 is a fragmentary sectional view of a portion of an exemplary form of rotor liner of the mill structure; and Figure 15 is a fragmentary horizontal sectional view of still another form of rotor liner used in the machine.

Figure 1:
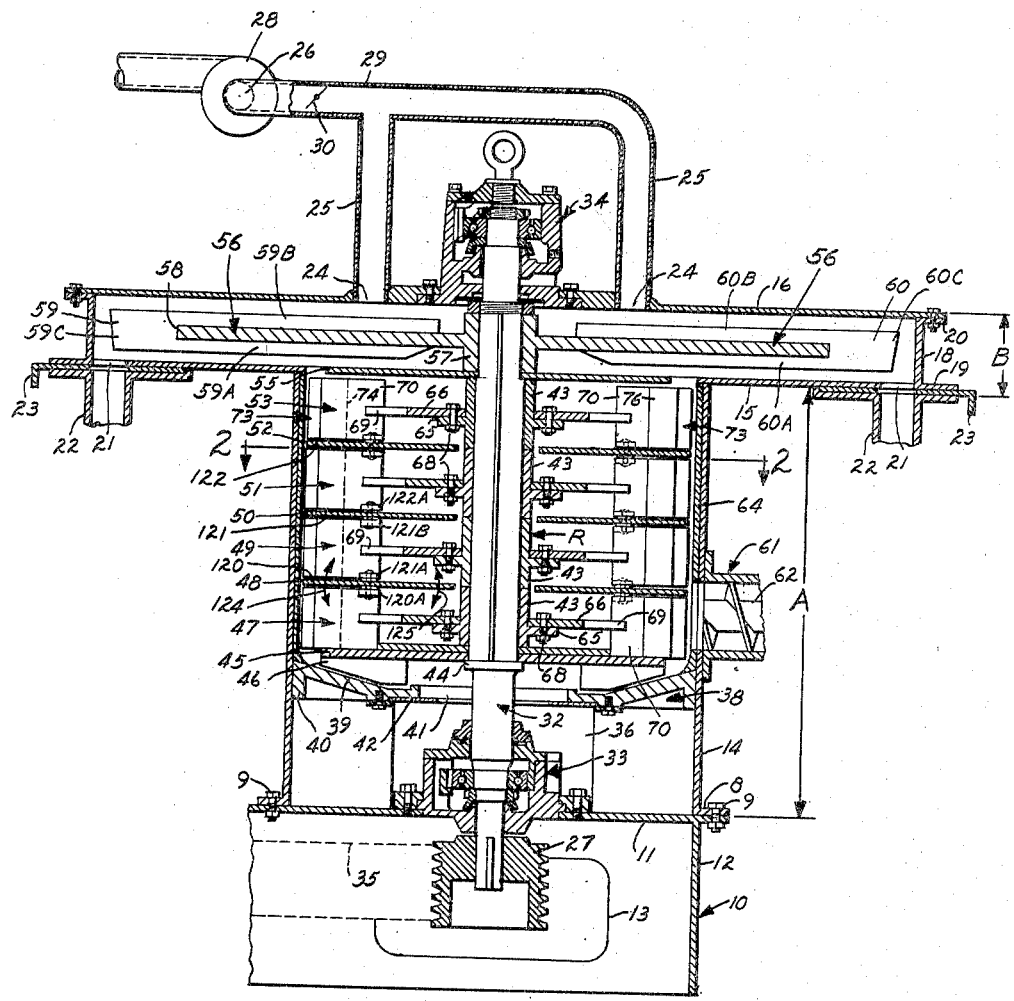
Figure 1 is a vertical sectional view of an exemplary form of apparatus in accordance with the invention.

Referring to Figure 1 in the exemplary form of apparatus the mill consists of a horizontal base structure generally designated 10. The base consists of a horizontal plate 11 which is supported by vertical plates 12 suitably attached to the horizontal plate 11 so as to form an open base housing, which is provided with an access opening at 13. The plate 11 forms the base on which the mill proper is mounted. The mill proper, which extends throughout the dimension A of Figure 1 includes a cylindrical outer shell 14 having a bottom flange at 8 which is bolted at 9 to the plate 11 of the base structure 10. The shell 14 terminates at its upper end and is attached to the lower plate 15 of a classifier section shown opposite the dimension B which may optionally be included in a rotary milling apparatus, if so desired. If desired the classifying apparatus (dimension B) can be made external and completely separate from the mill structure per se. The classifier housing is essentially cylindrical having the lower plate 15 and an upper plate 16 which are attached together by the cylindrical shell 18. The shell 18 has lower and upper flanges 19 and 20 to which the plates 15 and 16 are attached, usually by bolts. Around the exterior of the cylindrical classifier section B are a plurality of downwardly extending ports 21—21 to which the return lines 22, for coarse material are adapted to be attached. Each return line 22 is preferably fitted with a slide gate at 23 by means of which the degree of opening of each port 21 may be varied to suit operating conditions.

The upper plate 16 of the classifier is provided with a plurality of ports 24—24 as close as possible to the center of plate 16 and at these ports are attached the exhaust lines 25—25 leading to the intake 26 of a suction blower 28 by means of which the finished pulverized material is removed. The common line 29 of the suction blower 28 is provided with a damper 30 so that the degree of suction can be regulated as desired.

I have found that for best results in a combined unit which includes a rotary mill and rotary classifier the diameter of the rotor 56 (section B) should be at least two times the diameter of the mill rotors (stages 47, 49, 51 and 53) of the mill section A.

Within the composite housing made up of the milling section A and the classifying section B, where used, there is mounted a rotor structure generally designated R. The rotor is carried by a central rotatable shaft generally designated 32 that is supported at its lower end by a bearing structure generally designated 33 and at its upper end by a bearing structure generally designated 34. The details of construction of the bearings 33 and 34 are within the province of mechanical design and need not be explained with particularity in this specification, other than to say that they are sufficiently rugged to withstand the high rotative speeds and vibratory forces imposed on the apparatus, and are adequately sealed against the entrance of dust, etc. The lower end of the shaft 32 is provided with a multiple V-belt pulley 27 over which the belts 35 are adapted to be run. Direct drives, gear drives or chain drives may be used. The lower portion of the milling section shelf 14 is provided with an air intake opening at 36 and immediately above such opening there is an inner diaphragm generally designated 38. The diaphragm 38 has a generally downwardly and inward sloping or shallow conical inner surface at 39 which is provided with an outer flange at 40 by means of which the diaphragm may be attached to the cylindrical shell 14 of the mill. The diaphragm terminates at a central opening 41 which may be varied in size by a ring 42, according to milling conditions.

The shaft 32 is provided with a collar at 44 and immediately above the collar there is pressed on a fan stage 45 which is in the form of a plate provided with radial blades 46 on its lower surface. Immediately above the plate 45 there are a plurality (in this case four) stages of radial blading separated from each other in each instance by spaces, the stages of radial blading being generally designated 47, 49, 51 and 53, and the spaces therebetween being designated 48, 50 and 52. The details of construction of the radial blading 47, 49, 51 and 53 and vibratory disks in the spaces 48, 50 and 52 will be described with greater particularity with reference to some of the other views, but it may be stated that each of the stages of radial blading includes a hub such as the hub 43 of the stage 47, the hubs being pressed onto and keyed to the shaft 32. Immediately above the stage 53 of radial blading is a diaphragm plate at 55 and above the plate 55 there is pressed on a fan stage generally designated 56 which forms a part of the classifier section B, where the classifier is built in conjunction with the mill. The rotor 56 of the classifier B is in the form of a simple plate provided with a hub at 57, the plate or disk 56 having an outer diameter at 58. To the plate or disk 56 there are attached radial blades as blades 59 and 60 which have portions 59A and 59B, above and below the disk 56 and a tip portion 59C. The blade 60 is similarly constructed.

The solid material to be pulverized may be introduced into the mill along with the gaseous fluid which flows through the window 36 and through the aperture 41 in the diaphragm 38, but it is preferably introduced by means of a feed screw generally designated 61 which is attached to the exterior surface of the cylindrical shell 14 of the mill, and is provided with a screw 62 by means of which the solid material is forced directly into the mill casing. The feed screw is entered at the second stage 49 in many instances. Both the cylindrical shell 14 and the liner 64 within the cylindrical shell are apertured so as to permit the passage of solid materials into the mill.

Within the mill 14 there is provided a liner 64 which may be of hard or soft material, depending upon the character of the solid material undergoing grinding or other treatment. In some instances, for example, the liner may be rubber vulcanized directly to the casing 14 of the mill, while in other instances the liner is of hard surface material, either bonded to the cylindrical shell 14 or constructed as separate and removable liner units. The liner may be smooth or be provided with alveoli or corrugations. The corrugations should preferably extend in a direction generally longitudinally of the mill casing, but they need not be parallel to the axis of the mill casing but can on the contrary be slanted slightly as a spiral of great pitch. The shape of the corrugations or alveoli may be in several forms as hereinafter more specifically referred to.

The stages 47, 49, 51 and 53 of radial blading within the mill structure may be identical or of different forms. In the illustrated embodiment of the invention shown in Figure 1 the stages of radial blading are identical with each other, and between each of the stages 47—49, 49—51 and 51—53 there are positioned disks which are free to vibrate. The construction of these disks is particularly disclosed in my co-pending applications Serial No. 213,720, filed March 3, 1951, and now abandoned and Serial No. 242,390, filed August 17, 1951, which are incorporated herein by reference. The particular form of radial blading utilized in Figure 1 is shown in greater detail in Figures 2 and 3, and since the various stages are identical only one will be described.

Figure 2:
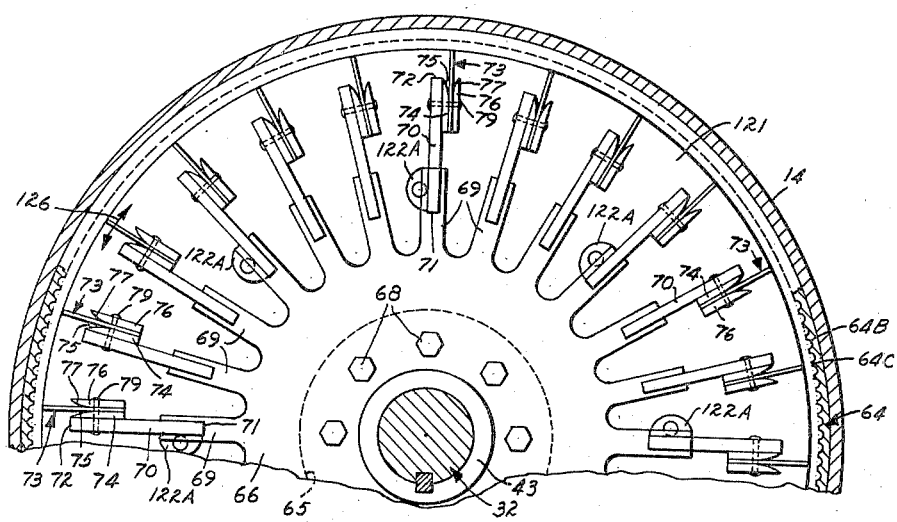
Figure 2 is a fragmentary horizontal sectional view taken along the line and in the direction of arrows 2—2 of Figure 1 and illustrating one form of rotor of the invention.
Figure 3:
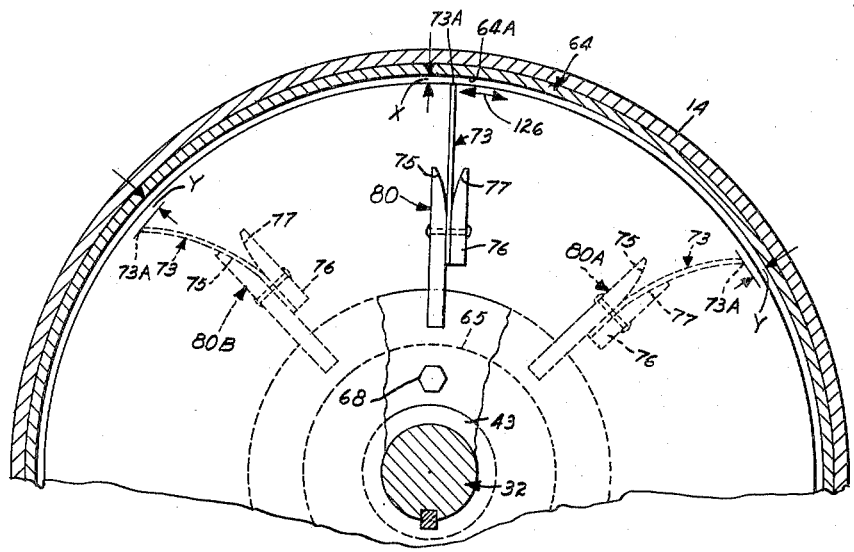
Figure 3 is a fragmentary transverse sectional view of a somewhat modified form of rotor showing a single radial element and illustrating the limiting extent of vibration of such radial element.

Referring to Figures 1, 2 and 3, and to stage 53, it will be observed that shaft 32 has pressed thereon a hub structure 43, the hub being provided with a flange at 65, which serves as a mounting to which the disk 66 is attached by means of a plurality of bolts 68. The disk is provided with a plurality of outwardly extending fingers 69 at even angular spacings, in this instance there being 24 such radial fingers on the disk 66. Each of the radial fingers serves as a mounting for a relatively stiff radial vane 70 which is welded or otherwise attached to the radial fingers 69. The radial blades 70 have an inner vertical edge at 71 and an outer vertical edge at 72 and has a vertical height as illustrated in Figure 1, such that when the successive stages are pressed together with the hubs 43 of each stage in abutment, a space 48 will be allowed between the radial blades 70 of the successive stages.

The relatively stiff radial blades 70 are provided at their outer ends with thinner flexible vibratory elements 73. These radial vibratory elements may be attached to the stiff radial blades 70 in any one of a variety of ways, several of which are herein illustrated.

In the form exemplified in Figure 2, the stiff radial blades 70 are provided with pads at 74 which are curved at 75 and with clamping plates 76 which are similar to the pads 74 and likewise curved as at 77. The flexible elements 73 are, in each instance, positioned between the pad 74 and the clamping plate 76 of the blade structure. The entire assembly is held together by the rivets 79.

The curve 75 on pad 74 and the curve 77 on the clamping plate 76 are shaped so as to conform to the natural curvature assumed by the flexible blade tip 73 as it vibrates.

These curves 74 and 77 are generated (designed) with some care, and are shaped so that the blade gradually contacts a progressively further outward area as the extent of vibration increases. Thus the blade 73 is clamped as shown. As it bends even slightly in vibrating, it immediately engages that part of the curve (of pad 74 or clamp plate 76, depending upon the direction of deflection) which is most near the clamping area. If the deflection is greater, the next adjacent area of the curve is contacted. Thus for each increment of increased deflection there is added an increased increment of contact. The net result is that the blade 73 wraps itself against the curve (of the pad 74 or clamp plate 76) in much the way that a whip lays itself against a curved surface. The end effect is that the curves cause a progressive outward distribution of the bending in the blade during each cycle of vibration regardless of the amplitude of vibration, and the thin flexible element is supported thereby. Stress concentration and breakage of the flexible elements 73 is thereby avoided.

By referring to Figure 3, which is a somewhat exaggerated showing of one blade of the same structure, as shown in Figure 2, the extent of vibration and its effect on clearances is illustrated. Thus, as in the full line position at 80, the blade 73 is in a median position, whereas in the dotted line figure at the right 80A, the blade 73 is deflected as during vibration until it curves into contact with the curved surface 77 of the clamping plate 76. Similarly, in the left-hand dotted position 80B the same blade 73 is illustrated as curved into contact with the curved surface 75 of the radial blades. In Figure 3, incidentally, the stiff supporting radial blade 80 is itself machined so as to form the pad, thus replacing a separate removable pad as at 74 in Figure 2. The operation, however, is identical to that shown in Figures 1 and 2.

Figure 3 illustrates one of the actions which takes place as the vibratory blades vibrate back and forth during rotation. In Figure 3 the amount of clearance between the tip 73A of the blade 73 and the inner surface 64A of the liner 64 is a minimum as shown by the dimension X, when the blade 73 is undeflected (full line position 80) whereas in either of the fully deflected positions 80A or 80B the corresponding amount of clearance between the tip end of the blade, has increased to a maximum amount Y. This serves not only greatly to increase the grinding efficiency of the apparatus, particularly in the production of ultrafine particles, but also assists in allowing the machine to clear itself of obstructions. Each of the vibratory radial blades shown in Figure 2 vibrates intensely as the rotor revolves. The vibration, and the grinding effect, for the production of ultrafine particles, may be greatly increased, particularly in respect to certain materials by providing alveoli or corrugations on the inner surface of the mill casing liner, as shown at 64B in Figure 2. In the form shown in Figure 2 the corrugations are substantially semi-circular and present sharp ridges 64C between the corrugations. No alveoli (or corrugations) are shown in Figure 3, and none are required to produce vibrations in blade tips 73 although they accentuate and perhaps force the vibration, where used. Even though no corrugations are initially formed in a mill casing, irregularities will form, possibly due to unavoidable irregularities in the materials used for the liners. Thus, even though the liner is smooth, it will, after awhile have irregularities therein.

The rapidity and amplitude of vibration of the vibratory radial bladings 73 contribute measurably to the instantaneous velocities of the edges of such vibratory blades relative the gaseous fluid passing through the mill. Thus, assuming a twelve-inch mill having surface irregularities of say four irregularities per inch average on the inside of the liner, there would be approximately 150 such irregularities throughout the periphery, and at an assumed rotative speed of 9000 R. P. M., each vibratory radial blade would pass 22,500 points of irregularity per second and accordingly have imposed thereon a frequency of approximately this amount. If one assumes an amplitude of vibration of $\frac{1}{16}$ of an inch from a median position of rest, the total travel of the edge of the disk is $\frac{4}{16}$ or $\frac{1}{4}$ of an inch for each complete vibration. The total movement of the edge of the vibratory blade would therefore be approximately 460 feet per second due to vibration alone, or slightly over 50 miles per hour. The gaseous fluid also has other components of velocity due to the rotary movement of the entire rotor structure and due to axial flow through the mill. Thus, the rotor having an outer diameter of approximately 12 inches rotating at 9000 R. P. M. has a peripheral speed of approximately 600 feet per second and the gaseous fluid may have an additional axial velocity component through the mill casing of as much as 10,000 feet per minute or 166 feet per second. As a result of the vectorial addition of these various velocities, the instantaneous speed of the vibratory elements relative the gaseous fluid and the solid particles carried thereby appears to be well within the subsonic range, with the result that subsonic shock waves are thereby induced. Available evidence justifies the belief that the exceptional grinding efficiency of the instant invention is due at least in part to the existence of such aerodynamic phenomena in combination with the shock imposed on the particles of solid material due to inter-particle collision or collision with solid surfaces of the mill.

Figure 4:
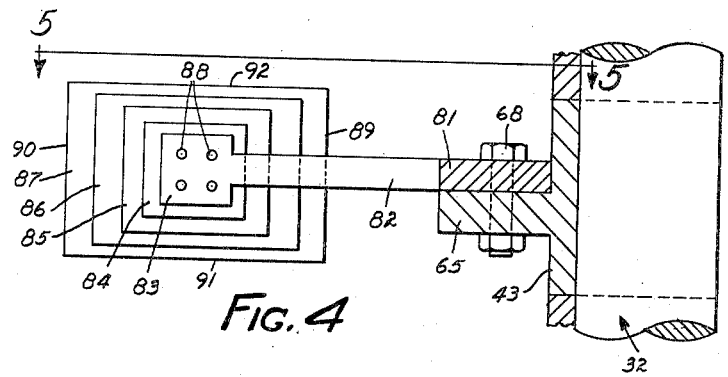
Figure 4 is a fragmentary vertical sectional view partially broken away of the rotor shaft of the rotary milling apparatus, shown separated from the remaining apparatus and illustrating one form of vibratory radial element.
Figure 5:
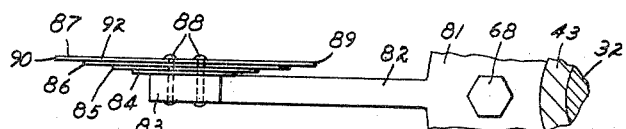
Figure 5 is a fragmentary horizontal sectional view taken along the line and in the direction of arrows 5—5 of Figure 4.

Referring to Figures 4 and 5 there is illustrated another form of radial blading. In this form the hub 43 is provided with a disk 81 having radial spokes 82 terminating at the relatively small pad 83 which serves as a mounting for a plurality of similar rectangular vibratory radial blades 84, 85, 86 and 87 which are attached to the pad portion 83 by rivets 88. The several vibratory elements 84–87 are similar in shape and are progressively larger from the smallest, 84, which is next adjacent the mounting pad portion 83 to the largest at 87. The entire radial blade composite structure is thus provided with a plurality of edges, all being free to vibrate in the manner of a spring. Thus, the inner edge 89 as well as the outer edge 90 of the structure is free to vibrate, while the lower edge 91 and the upper edge 92 are likewise free to vibrate.

Figures 6, 8:
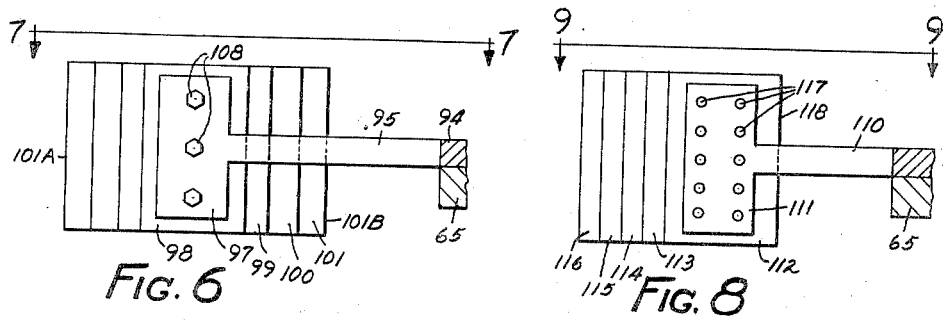
Figure 6 is a fragmentary vertical sectional view of a modified form of vibratory radial blade element shown separated from the machine.
Figure 8 is a vertical elevational view of still another form of vibratory radial blade element shown separated from the remaining elements of the machine.
Figure 7:
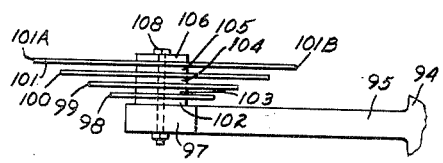
Figure 7 is a horizontal view taken along the line and in the direction of arrows 7—7 of Figure 6.

In Figures 6 and 7 there is illustrated another form of the invention wherein the disk 94 is provided with a radial arm 95 terminating in the relatively stiff mounting pad 97. Upon the pad 97 there are mounted a plurality of vibratory radial blades 98, 99, 100 and 101, which are separated by the spacing washers 102, 103, 104 and 105, which can be shaped as at 75 and 77, Figure 2, to support the blades, if desired. An outer clamping washer 106 is provided and the whole assembly is held in place by the through bolt 108. In this form each of the radial blades 98–101 has edges which are free to vibrate, such as the outer edge 101A of the blade 101 and the inner edge 101B. The outer and inner edges of the successively smaller vibratory radial blades 100, 99 and 98 are likewise free to vibrate.

Figure 9:
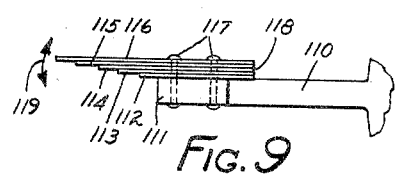
Figure 9 is a horizontal sectional view taken along the line and in the direction of arrows 9—9 of Figure 8.

In the form of invention shown in Figures 8 and 9 the radial arm 110 terminates in the pad 111, to which a plurality of flexible blades 112, 113, 114, 115 and 116 are attached in stacked relation and held in place by the rivets 117 in the manner of a leaf spring. In this form of the invention the matching inner edges at 118 do not vibrate, but the outer edges of each of the blades moves back and forth as in the manner of the double arrow 119 and produces intense vibratory energy.

Referring to Figure 1 in the spaces 48, 50 and 52, between the radial blade stages there are positioned vibratory disks 120, 121 and 122 which are mounted on three or more mounting brackets as at 120A, 121A and B and 122A. These mounting brackets are formed on the relatively stiff radial blade portions 70 and the disks 120–122 are accordingly free to vibrate, both at their outer and inner edges. This form and manner of mounting such disks 120–122 is more particularly described in my applications above identified. The construction of the form of vibratory disk, per se, forms no part of the invention, except as it cooperates with the vibratory radial blading as herein explained. It will be observed from Figure 1 that the vibratory radial disks 120, 121 and 122 vibrate at their inner and outer edges longitudinally in respect to the mill casing as illustrated by the double arrow 124 and 125, and thus move toward and away from the adjacent edges of the vibratory radial blades 73 which themselves are vibrating radially back and forth as indicated by the double arrow 126 of Figures 2 and 3. The vibration of the disks 120, 121 and 122 is very intense but may not necessarily be at the same frequency of vibration as is achieved by the vibratory radial blades 73, and both the blades and disks may have fundamental and harmonic frequencies. Accordingly in the region of the upper and lower corners of each of the vibratory radial blades 73, which are most adjacent the outer edges of each the vibratory disks 120, 121 and 122, there are established conditions of intense sonic energy which is imposed upon the gaseous fluid and upon the solid particles carried thereby.

Referring to Figures 10 and 11 there is illustrated another slightly modified form of the invention. In these figures the shaft 32 carries a plurality of stages of radial blades which may be the same or identical. In this figure three such identical stages are illustrated, but it will be understood that more or less stages may be utilized if desired, and they may individually be of any of the illustrated forms. Thus, the shaft 32 is provided with hubs 127, 128 and 129, and between each of these hubs there are a pair of mounting rings 130—130 (between hubs 127 and 128) and rings 131—131 (between the hubs 128 and 129). The mounting rings 130—130 serve to support the inner edge of a vibratory disk 132 and the rings 131—131 serve to support and mount the vibratory disk 133. The hub 127 serves to support the disk 134 which has a plurality, in this instance twenty-four, radially extending fingers 135 which have at their outer ends substantially rectangular mounting pads 136. This rectangular blade serves as a mounting pad for the vibratory radial blade 137. The face of the pad 136 which is most adjacent the vibratory blade 137 is curved at 136A and 136B and the vibratory blade 137 is held in place by a clamping plate 138 which is similarly curved off at 138A and 138B, the entire assembly being held in place by the rivets 139. This form of construction is similar to the form shown in Figures 2 and 3, except that the rectangular pad 136 is curved off at its inner as well as its outer edges and the clamping plate 138 is similarly curved at its inner and outer edges. Accordingly, the outer edge 137A and the inner edge 137B of each of the vibratory radial blades is free to vibrate back and forth.

In addition the stiff radial pad 136 is provided with a curved portion 136C at its upper edge and a similarly curved portion 136D at its lower edge as shown in Figure 12, and the clamping plate 138 is similarly curved off at the upper edge 138C and the lower edge 138D. Accordingly, the upper edge 137C of the radial blade, as well as the lower edge 137D is likewise free to vibrate.

In the form of invention shown in Figures 9–12 the inner liner generally designated 140 is made in a plurality of sections 140A, 140B and 140C, which are nested together one on top of the other as shown in Figure 10. This allows the several sections to be made so as to be readily replaceable and in addition permits the ready use of differing number of corrugations or alveoli on the inner surface of the liners, for producing different rates and degrees of vibration in the radial blading and the vibratory disk 132—133. Thus, the lower stage 140A may, if desired, be provided with a lesser number of corrugations than that at 140B and the upper stage 140C may, if desired, be provided with an increased number of corrugations as compared with the stage at 140B. Also, in some instances one or more upper stages can have the inner surfaces of the liners smooth or even made of resilient material such as rubber. Thus in the grinding of silica for special purposes, hard surfaced liners in the lower stages will produce the desired size reduction and one or two upper stages lined with smooth material or synthetic rubber will produce a polishing and rounding of the small particles, which is an entirely new product. Other materials can be handled similarly.

Referring to Figure 13 there is illustrated still another form of radial blading of the invention which is similar to that shown in Figures 10–12 except that the vibratory radial blade generally designated 141 is composed of a plurality of leaves 142, 143 and 144, of successively increased dimensions in each side from the center blade. This allows some support to be provided to the central leaf 144 in the manner of a leaf spring. The entire assembly is clamped between the curved pad and clamping plate, to afford long life for the vibratory blade elements.

In Figure 13 there is also illustrated a deep form of relatively smoothly rounded corrugations as compared with the type of corrugations shown for the liners in Figures 2 and 11. Other forms of corrugations (alveoli) are shown in Figures 14 and 15, wherein a re-entrant pocket or alveolus is shown as at 145 in Figure 14, with a sharp edge 146 presented against the direction of rotation of the rotor, which is illustrated by the arrow 147. A saw-tooth type of corrugation is illustrated in Figure 15, the direction of rotation here being in the direction as shown by arrow 148. The sharp surface at 149 or form of corrugations shown in Figure 15 and the surface 150 and edge 146 of the form of recessed corrugation shown in Figure 14 are especially useful in generating sharply defined and intense sonic energy due to the passage near them of the speedily rotating radial blades.

In each of the illustrated embodiments of the invention the radial blades are made of a diameter such that they are relatively close to the inner surface of the mill liner. Thus, in a mill having a twelve-inch diameter the normal clearance between the tip of the radial blade and the adjacent surface of the liner, as shown by the dimension X in Figure 3, may range from a few thousandths of an inch to a half-inch or more depending upon the material handled. This clearance may be decreased in successive stages from the bottom stage of the mill to the top stage, if desired. For larger mills the same or larger clearances may be utilized. In general the smaller such clearances are maintained, the more intense will be the sonic energy generated and the finer grinding produced on the solid material processed through the mill.

The very words "sonic" and "sound" as used in conjunction with the instant specification may be considered as something of misnomers since they connote a physical effect which may be heard. Yet the energy levels observed (by direct measurement on the inside surface of a mill made substantially like Figure 15) were of an order of magnitude 20 to 50 times greater than the maximum sound intensities that could be heard by the average human ear and well beyond the threshold of pain, and frequencies observed exceed the highest pitches capable of being heard by humans. Peak-to-peak pressure differentials in the gaseous medium of .025 atmosphere were observed, which are values so high that the human ear would be destroyed or deteriorated if exposed to them.

Hence, while the terms "sound" and "sonic" have been used herein, it will therefore be understood that such terms refer to vibrations in the gaseous medium like those, which at very much lower energy levels and appropriate frequencies, can be heard.

As many apparently widely different embodiments of this invention may be made without departing from the spirit and scope thereof, it is to be understood that I do not limit myself to the specific embodiments herein.

I claim as my invention:

1. The method of disintegrating dry solid materials which comprises feeding a controlled supply of the solid material and a carrying gas into a substantially cylindrical grinding area and continuously grinding the solid material by attrition of particle against particle and particle against gas stream by whirling a fluidal stream of particles of the solid material entrained in the gas at high speed in a radial path around the outer periphery of the cylindrical grinding area while at the same time subjecting the fluidal stream to vibratory shock waves.

2. The method of processing solid material to reduce the size thereof which comprises feeding a controlled supply of the solid material and a carrying gas into a substantially cylindrical grinding area and continuously grinding the solid material at least in part by collision of particle upon particle and collision of particle against gas stream by whirling a fluidal stream of particles of the solid material entrained in the gas at high speed in a radial path around the outer periphery of the cylindrical grinding area while at the same time subjecting the fluidal stream to vibratory shock waves ranging from subsonic to supersonic frequencies.

3. The method of processing solid material to reduce the size thereof which comprises feeding a controlled supply of the solid material and air into a substantially cylindrical grinding area and continuously grinding the solid material at least in part by collision of particle upon particle and collision of particle against air stream by whirling a fluidal stream of particles of the solid material entrained in the air in a radial path around the outer periphery of the grinding area while at the same time subjecting the fluidal stream to shock waves ranging from subsonic to supersonic frequencies.

4. The apparatus comprising a rotor journalled or rotation about the longitudinal axis thereof, a plurality of generally flat vanes of resilient material, each mounted on the rotor for free vibration of at least an edge thereof, said vanes being mounted so as to extend generally outward from the axis of rotation of the rotor and with the plane of said vanes generally longitudinal with respect to the rotor and a casing enclosing said rotor, said casing being in close proximity to the path of rotation of the outer edges of said blades.

5. An apparatus for pulverizing solid materials which consists of a substantially cylindrical casing having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, substantially flat vanes attached substantially radially on said shaft, each being in a plane generally longitudinal in respect to the casing and having an edge thereof close to the inside of the casing, each of said vanes including at least one sheet of resilient material of which at least an outer edge portion is resilient and capable of vibration as it moves.

6. The apparatus of claim 5 being further characterized in that a plurality of sheets of resilient material are attached together to form each radial vane.

7. The apparatus of claim 6 being further characterized in that mutually adjacent sheets of resilient material are mounted on said radial vanes with their outer edges at successively greater distances from the inside surface of the casing.

8. The apparatus of claim 6 being further characterized in that the mutually adjacent sheets of resilient material are geometrically similar.

9. The apparatus of claim 6 being further characterized in that spacers are provided between adjacent sheets of resilient material.

10. An apparatus for pulverizing solid materials which consists of a substantially cylindrical casing having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, substantially flat vanes attached substantially radially on said shaft, each being in a plane generally longitudinal in respect to the casing and having an edge thereof close to the inside of the casing, each of said vanes including at least one sheet of resilient material of which at least an outer edge portion is resilient and capable of vibration as it moves, said casing having corrugations on its inner surface which extend generally longitudinally of the casing.

11. An apparatus for pulverizing solid materials which consists of a substantially cylindrical casing and having an inlet and outlet, means for moving a flow of gaseous fluid generally axially therethrough, means for the introduction of solid material into said casing for movement with the gaseous fluid therethrough, a rotary unit located within said casing, said unit including a centrally located shaft journalled for rotation in said casing, substantially flat vanes attached substantially radially on said shaft, each being in a plane generally longitudinal in respect to the casing and having an edge thereof close to the inside of the casing, each of said vanes including at least an outer edge portion which is resilient and capable of vibration as it moves, said casing having a plurality of alveoli on its inner surface.

12. An apparatus for pulverizing solid materials which consists of a substantially cylindrical casing and having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, a plurality of grinding stages on said shaft, each stage including a plurality of radial blades of resilient material, which blades extend generally longitudinally of the casing, said stages being spaced from each other, and disk means mounted in each of said spaces for rotation with said shaft, each disk means being of resilient material and having at least its outer edge free to vibrate, said edge being closely adjacent the inside of the casing.

13. An apparatus for pulverizing solid materials which consists of a substantially cylindrical casing having an inlet and outlet, means for moving a flow of gaseous fluid in a generally axial direction therethrough, means for the introduction of solid material into said casing for movement with the gaseous fluid therethrough, a rotary unit located within said casing, said unit including a centrally located shaft journalled for rotation in said casing, a hub on said shaft having radially spaced mountings therearound, a radial blade unit attached at each mounting, each such radial blade unit including a relatively non-resilient portion and a flexible edge attached thereto, said edge extending closely adjacent the inside surface of the casing.

14. An apparatus for pulverizing solid materials which consists of a substantially cylindrical casing and having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, a hub on said shaft having radially spaced mountings therearound, a radial blade unit attached at each mounting, each such radial blade unit including a relatively non-resilient portion, a flexible blade attached generally at its central portion to said non-resilient portion and having at least several of its edges spaced therefrom so as to be free to vibrate.

15. An apparatus for pulverizing solid materials which consists of a substantially cylindrical casing having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, a hub on said shaft having radially spaced mountings therearound, a radial blade unit attached at each mounting, each such radial blade unit including a relatively non-resilient portion and a resilient portion, said resilient portion being clamped to said non-resilient portion.

16. An apparatus for pulverizing solid materials which consists of a substantially cylindrical casing and having an inlet and outlet, means for moving a flow of gaseous fluid therethrough, means for the introduction of solid material into said casing for movement with the gaseous fluid therethrough, a rotary unit located within said casing, said unit including a centrally located shaft journalled for rotation in said casing, a hub on said shaft having radially spaced mountings therearound, a radial blade unit attached at each mounting, each such radial blade unit including a relatively non-resilient portion and a resilient portion, said resilient portion being clamped to said non-resilient porton generally at its central sector, said non-resilient portion making contact with said resilient portion generally at its central sector, the outer portion of at least one edge of said non-resilient portion having a curved surface for setting a limit to the degree of flexing of the attached resilient portion.

17. An apparatus for processing solid material comprising a mill section and a classifier section in combination, said mill and classifier sections each being housed in substantially cylindrical casings, the classifier section being mounted coaxially adjacent said milling section, and in communication with said milling section through an aperture in a surface common to each of said sections, the diameter of the classifier section being at least twice that of said milling section, said combination having a common shaft journalled for rotation about its longitudinal axis therein, a plurality of relatively flat vanes mounted upon said shaft and running in close clearance with said casings, and means for carrying solid material in a flow of gaseous fluid through said combination.

References Cited in the file of this patent

UNITED STATES PATENTS

| Number | Name | Date |
|---|---|---|
| 388,375 | Ruddick | Aug. 21, 1888 |
| 657,398 | Day | Sept. 4, 1900 |
| 1,211,736 | Marshall | Jan. 9, 1917 |
| 1,569,561 | Miller | Jan. 12, 1926 |
| 1,756,253 | Lykken | Apr. 29, 1930 |
| 1,777,205 | Kutaszewicz | Sept. 30, 1930 |
| 2,294,920 | Lykken | Sept. 8, 1942 |
| 2,440,285 | Lykken | Apr. 27, 1948 |